United States Patent
Boerker

(10) Patent No.: US 6,782,067 B2
(45) Date of Patent: Aug. 24, 2004

(54) ASYNCHRONOUS DATA RECEPTION CIRCUIT OF A SERIAL DATA STREAM

(75) Inventor: Philipp Boerker, Munich (DE)

(73) Assignee: Infineon Technologies AG, Munich (DE)

( * ) Notice: Subject to any disclaimer, the term of this patent is extended or adjusted under 35 U.S.C. 154(b) by 63 days.

(21) Appl. No.: 10/202,178

(22) Filed: Jul. 24, 2002

(65) Prior Publication Data

US 2003/0035502 A1 Feb. 20, 2003

Related U.S. Application Data

(63) Continuation of application No. PCT/EP02/00352, filed on Jan. 15, 2002.

(51) Int. Cl.[7] ............................. H04L 25/00; H03M 9/00
(52) U.S. Cl. ............................ 375/372; 341/100; 710/71
(58) Field of Search ................................ 341/100, 101, 341/106, 95; 377/47, 28, 64, 73; 375/354; 327/100; 710/71

(56) References Cited

U.S. PATENT DOCUMENTS

| | | | | |
|---|---|---|---|---|
| 4,015,252 A | | 3/1977 | Symanski | 340/347 |
| 4,901,076 A | * | 2/1990 | Askin et al. | 341/100 |
| 5,223,833 A | * | 6/1993 | Akata | 341/100 |
| 5,774,079 A | * | 6/1998 | Zirngibl | 341/100 |
| 5,777,567 A | * | 7/1998 | Murata et al. | 341/100 |
| 6,150,965 A | | 11/2000 | Carr et al. | 341/101 |
| 6,169,500 B1 | * | 1/2001 | Eriksson et al. | 341/100 |

FOREIGN PATENT DOCUMENTS

| | | |
|---|---|---|
| DE | 689 19 211 T2 | 5/1995 |
| DE | 195 29 690 A1 | 8/1996 |
| DE | 690 25 510 T2 | 9/1996 |
| EP | 0 220 802 A2 | 5/1987 |
| EP | 0 813 153 A2 | 12/1997 |

* cited by examiner

Primary Examiner—Stephen Chin
Assistant Examiner—Jason M. Perilla
(74) Attorney, Agent, or Firm—Jenkins, Wilson & Taylor, P.A.

(57) ABSTRACT

Data reception circuit for receiving a serial input data stream, where the data reception circuit has a data stream separation circuit (4) for separating the serial input data stream into a plurality of separate data streams, a reference clock signal generation circuit (13) for generating a reference clock signal, a delay circuit (12) having a delay element chain (27) which comprises a plurality of series-connected delay elements, the first delay element (27-1) in the delay element chain (27) receiving the generated reference clock signal, and each delay element outputting a delayed reference clock signal (11), a first, asynchronously clocked register array (8), each register bank (26) in the first register array (8) being asynchronously clocked by an associated separate data stream and reading in the delayed reference clock signals from the delay circuit (12) in order to buffer-store a signal change in the separate data stream, a second, synchronously clocked register array (17), each register bank (28) in the second register array (17) being synchronously clocked by the reference clock signal and reading in and buffer-storing the register content of an associated register bank (26) in the first register array (8) and a synchronously clocked logic circuit (18) which evaluates the register content buffer-stored in the second register array (17) in order to reconstruct the serial input data stream.

27 Claims, 2 Drawing Sheets

ASYNCHRONOUS DATA RECEPTION CIRCUIT OF A SERIAL DATA STREAM

RELATED APPLICATIONS

This application is a continuation of PCT patent application No. PCT/EP02/00352, filed Jan. 15, 2002, which claims priority to German patent application number 10101718.9, filed Jan. 15, 2001, the disclosures of each of which are incorporated herein by reference in their entirety.

TECHNICAL FIELD

The invention relates to a data reception circuit for receiving a serial input data stream with a very high data transfer rate.

BACKGROUND ART

DE 689 19 211 T2 describes a receiver for serial data. The receiver contains shift registers into which samples of a data bit stream are read. The sample points are separated from one another by no more than half a data bit period. A decoder evaluates the samples which the shift register contains.

DE 195 29 690 A1 describes a microcomputer. The microcomputer contains a serial input/output circuit for outputting data, with parallel data being converted into serial data, and serial input data being converted into parallel data. The microcomputer contains a built-in serial input/output circuit having a clock signal supply device for applying a transfer clock signal to the serial input/output circuit. The microcomputer also contains an initialization device for initializing the clock supply device on the basis of a signal from an external circuit.

DE 690 25 510 T2 describes an asynchronous high-speed data interface. The asynchronous interface is used for processing serial data frames which are transferred in synchronism by a first clock, the interface comprising a device provided for serial/parallel conversion of the data using a first clock. The interface also contains a data buffer and a device provided for filling the data buffer with the serial/parallel converted data. The asynchronous interface also contains a further device for processing the data from the buffer in synch with a second clock, which is asynchronous with respect to the first clock, the second device starting the processing operation before the first device has completed the filling operation.

With an increasing transfer rate, data or information are/is transferred via a transfer channel in shorter and shorter times. The higher the data transfer rate, the higher the circuit complexity for the data reception circuit for receiving the input data stream received at the high data transfer rate, however. Conventional data reception circuits, which can receive a serial input data stream with a very high data transfer rate, also have a high power consumption on account of their circuit complexity.

SUMMARY OF THE INVENTION

It is therefore the object of the present invention to produce a data reception circuit for receiving a serial input data stream with a high data transfer rate which has low circuit complexity.

The invention achieves this object by means of a data reception circuit having the features specified in patent claim 1.

Other advantageous refinements of the inventive data reception circuit are specified in the subclaims.

The invention produces a data reception circuit for receiving a serial input data stream with a high data transfer rate, where the data reception circuit has:
- a data stream separation circuit for separating the serial input data stream into a plurality of separate data streams with a reduced data transfer rate,
- a reference clock signal generation circuit for generating a reference clock signal whose clock frequency corresponds to the data transfer rate of the separate data streams,
- a delay circuit having a delay element chain which comprises a plurality of series-connected delay elements, the first delay element in the delay element chain receiving the generated reference clock signal, and each delay element outputting a delayed reference clock signal via a signal output in the delay circuit,
- a first, asynchronously clocked register array which comprises a plurality of register banks, each register bank in the first register array being asynchronously clocked by an associated separate data stream and reading in the delayed reference clock signals from the delay element chain in order to buffer-store a signal change in the separate data stream,
- a second, synchronously clocked register array which comprises a plurality of register banks, each register bank in the second register array being synchronously clocked by the reference clock signal and reading in and buffer-storing the register content of an associated register bank in the first register array, and
- a synchronously clocked logic circuit which evaluates the register content buffer-stored in the second register array in order to reconstruct the serial input data stream.

One advantage of the inventive data reception circuit is that the data stream separation circuit has a very small input capacity, and hence an input signal with a very high data frequency can be received by the inventive data reception circuit. This means that it is possible to receive a serial input data stream with a very high data transfer rate of, by way of example, 10 Gbit/sec.

Another advantage of the inventive data reception circuit is that it is not the received high-frequency input signal that is routed via the delay element chain in the delay circuit, as in conventional receiver arrangements, but rather a relatively low-frequency reference clock signal, which results in significantly reduced interference in the data reception circuit through "pattern noise". With pattern noise interference, the irregular data signal received interferes with itself. Pattern noise cannot arise in the inventive data reception circuit, since the reference clock signal applied to the delay element chain is a regular, relatively low-frequency signal.

Another advantage of the inventive data reception circuit is that the circuit structure of the data reception circuit can be of modular design comprising similar modules, and hence is easy to implement and integrate in terms of circuitry.

Another advantage of the inventive data reception circuit is that the synchronously clocked logic circuit for reconstructing the serial input data stream can be implemented with automatic synthesis (VHDL), so that simple transfer to other technologies with little development complexity is ensured.

In one preferred embodiment of the inventive data reception circuit, each register bank in the first, asynchronously clocked register array has a first register for buffer-storing a rising signal edge in the associated separate data stream, and a second register for buffer-storing a falling signal edge in the associated separate data stream.

In one preferred embodiment of the inventive data reception circuit, each register bank in the second, synchronously clocked register array has two registers which read in the register content of the two registers in the associated register bank with in the first register array upon a rising signal edge in the reference clock signal.

The registers in the first register array and in the second register array preferably comprise a plurality of edge-triggered D-type flip-flops.

The number of edge-triggered D-type flip-flops in the registers in the first register array and in the second register array is preferably equal to the number of series-connected delay elements in the delay element chain.

The clock inputs of the D-type flip-flops in the first registers in all the register banks within the first, asynchronously clocked register array preferably receive a separate data stream which is output by the data stream separation circuit.

The clock inputs of the D-type flip-flops in the second registers in all the register banks within the first, asynchronously clocked register array preferably receive, in inverted form, a separate data stream which is output by the data stream separation circuit.

The data inputs of the D-type flip-flops in the first register and in the second register in a register bank in the asynchronously clocked first register array are preferably connected to an associated signal output in the delay circuit.

The clock inputs of the D-type flip-flops in the registers in all the register banks within the second, synchronously clocked register array, preferably receive the generated reference clock signal.

The data inputs of the D-type flip-flops in the first register in a register bank in the second, synchronously clocked register array are preferably connected to data outputs of the D-type flip-flops in the first register in an associated register bank in the first, asynchronously clocked register array.

The data inputs of the D-type flip-flops in the second register in a register bank in the second, synchronously clocked register array are preferably connected to data outputs of the D-type flip-flops in the second register in an associated register bank in the first, asynchronously clocked register array.

The data outputs of the D-type flip-flops in the register banks in the second, synchronously clocked register array are preferably connected to the synchronously clocked logic circuit.

In one particularly preferred embodiment of the inventive data reception circuit, the data stream separation circuit comprises a plurality of data stream separation circuit elements connected in cascade form in a plurality of separation stages, the data transfer rate of the serial input data stream being halved with every separation stage.

The number of separate data streams is preferably $2^k$, where k is the number of separation stages.

In one preferred embodiment of the inventive data reception circuit, the delay element chain comprises a plurality of series-connected inverters with an adjustable signal propagation time.

In this case, the number of series-connected delay elements is preferably equal to the ratio between the clock period of the reference clock signal and the signal propagation time of a delay element.

The signal propagation time of a delay element is preferably not greater than the time period of a received data bit in the serial input data stream.

The signal propagation time of a delay element is preferably a quarter of the time period of a received data bit in the serial input data stream.

The reference clock signal generation circuit in the inventive data reception circuit preferably has a low-frequency oscillator which oscillates at a low frequency corresponding to the data transfer rate of the separate data streams.

In one alternative embodiment, the reference clock signal generation circuit has a high-frequency oscillator which oscillates at a high frequency, and a frequency divider which divides down the high frequency into a low frequency corresponding to the data transfer rate of the separate data streams.

The oscillator is preferably a voltage-controlled oscillator.

The reference clock signal generated by the reference clock generation circuit preferably has a constant phase difference with respect to the serial input data stream.

In one preferred embodiment of the inventive data reception circuit, the reference clock signal generation circuit has a phase difference calculation unit which calculates the phase difference between the reference clock signal and the serial input data stream and outputs a digital phase difference signal.

In this case, the digital phase difference signal is preferably filtered by a digital filter for the purpose of signal stabilization.

The filtered digital phase difference signal is preferably converted by a digital/analog converter into an analog oscillator control voltage for the voltage-controlled oscillator in the reference signal generation circuit, where the voltage-controlled oscillator oscillates at an altered frequency on the basis of the applied oscillator control voltage in order to minimize the phase difference between the reference clock signal and the serial input data stream.

In one particularly preferred embodiment of the inventive data reception circuit, the logic circuit has a thermometer coding circuit for thermometer-coding the delayed reference clock signals which are output from the signal outputs of the delay elements.

The logic circuit preferably XORs the register contents of the registers in the second register array in cascade form in order to reconstruct the serial input data stream.

The delay circuit in the inventive data reception circuit preferably performs phase coupling between the delayed reference clock signal from the last delay element in the delay element chain and the reference signal for the input signal for the first delay element in the delay element chain.

In this case, the delay circuit preferably has a phase detector whose first signal input is connected to the signal output of the first delay element, whose second signal input is connected to the signal output of the last delay element, and whose output has a digital filter connected to it which outputs a control signal for controlling the delay element chain.

In one particularly preferred embodiment of the inventive data reception circuit, the data stream separation circuit has data stream separation circuit elements connected in cascade form in four separation stages, where the delay element chain contains sixty-four delay elements, and the first register array and the second register array each contain sixteen register banks, with each register bank having two registers which each comprise sixty-four D-type flip-flops.

In one particularly preferred embodiment, the signal propagation time of a delay element is approximately 25 psec.

The inventive data reception circuit is preferably used for receiving a serial data stream with a data transfer rate of 10 Gbit/sec.

Preferred embodiments of the inventive data reception circuit are described below with reference to the appended figures in order to explain features which are fundamental to the invention.

DETAILED DESCRIPTION OF THE INVENTION

Figure 1:
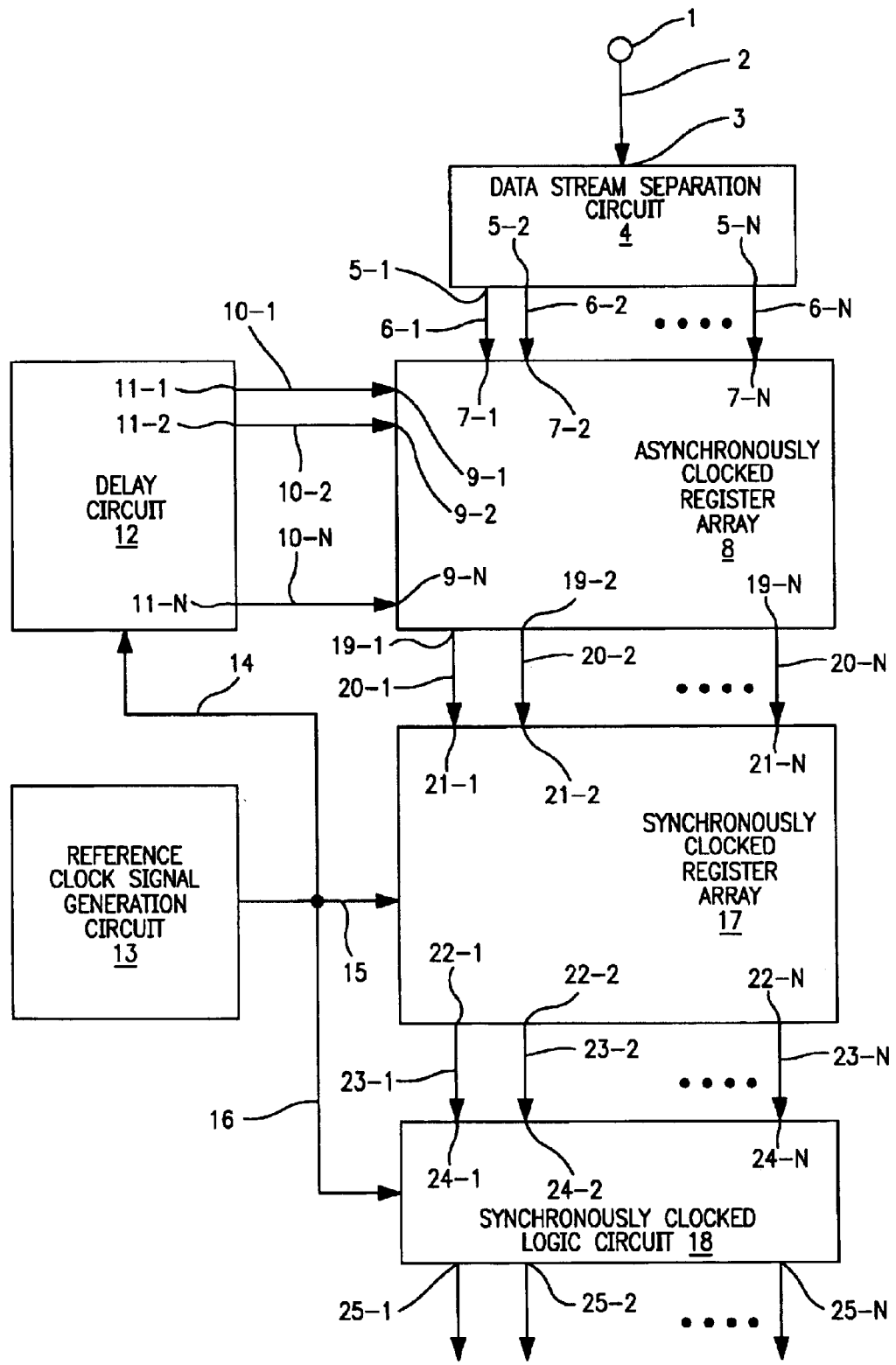
FIG. 1 shows a block diagram of the inventive data reception circuit for receiving a serial input data stream with a high data transfer rate.

As can be seen from FIG. 1, the inventive data reception circuit has a signal input 1 for receiving a serial input data stream with a very high data transfer rate of, by way of example, 10 Gbit/sec. The received serial input data stream is supplied via a line 2 to a signal input 3 of a data stream separation circuit. The data stream separation circuit separates the serial input data stream into a plurality of separate data streams with a reduced data transfer rate, the separate data streams being output via signal outputs 5-1, 5-2 to 5-N and associated signal lines 6-1, 6-2 to 6-N to signal inputs 7-1, 7-2, 7-N of a downstream asynchronously clocked first register array 8.

The data stream separation circuit 4 for separating the serial input data stream comprises data stream separation circuit components connected in cascade form to a plurality of separation stages, as described in detail in German patent application No 100 61 768.9. In this case, each data stream separation circuit element has a signal input for receiving a serial input data stream with a particular data transfer rate, a first edge-triggered flip-flop which switches upon a rising signal edge in the serial input data stream and outputs a first serial output data stream with half the data transfer rate via a first signal output of the data stream separation circuit element, and a second edge-triggered flip-flop which switches upon a falling signal edge in the serial input data stream and outputs a second serial output data stream with half the data transfer rate via a second signal output of the data stream separation circuit element.

The data stream separation circuit 4 shown in FIG. 1 contains a plurality of data stream separation circuit elements which are connected in a tree structure. In this case, data stream separation circuit components have a completely differential design. The data stream separation circuit 4 distributes the events or signal changes arising at the data signal input 3, i.e. falling and rising signal edges in one preferred embodiment, over sixteen signal outputs 5-1 to 5-16 which output a separate data stream with a reduced data transfer rate which is sixteen times lower than the data transfer rate of the received serial data stream. If the data transfer rate of the serial input data stream is 10 Gbit/sec, for example, the data stream separation circuit 4 outputs a separate data stream with a reduced data transfer rate of 1.25 Gbit/sec at each signal output 5. In this embodiment, the data stream separation circuit 4 has four separation stages which are connected in cascade form one behind the other, the data transfer rate being halved with each separation stage. In this case, the maximum regularity of signal changes or events drops from a data stream separation circuit having four separation stages to one sixteenth at each data output 5-1, 5-N of the data stream separation circuit 4.

The separate data streams are buffer-stored in a downstream asynchronously clocked register array 8. The first, asynchronously clocked register array has clock inputs 9-1, 9-N for receiving delayed reference clock signals via lines 10-1 to 10-N from signal outputs 11-1 to 11-N in a delay circuit 12.

The data reception circuit 4, as is shown in FIG. 1, also contains a reference clock signal generation circuit 13 for generating a reference clock signal whose clock frequency corresponds to the data transfer rate of the separate data streams which are on the signal lines 6-1 to 6-N. The reference clock signal generation circuit 13 outputs the generated reference clock signal via clock signal lines 14, 15, 16 to the delay circuit 12, to a second, synchronously clocked register array 17, and to a synchronously clocked logic circuit 18.

The first, asynchronously clocked register array 8, which is connected downstream of the data stream separation circuit 4, comprises a plurality of register banks, with each register bank in the first register array 8 being clocked by an associated separate data stream which is applied to the signal inputs 7-1 to 7-N and reading in the delayed reference clock signals via the signal lines 10-1 to 10-N from the delay circuit 12 in order to buffer-store the time of a signal change in the separate data stream. The register banks in the first register array 8, asynchronously clocked by the delay circuit 12, are connected via data outputs 19-1 to 19-N and via data lines 20-1 to 20-N to signal inputs 21-1 to 21-N of the second, synchronously clocked register array 17 which are connected to associated register banks within the second, synchronously clocked register array 17. Each register bank in the second, synchronously clocked register array 17 is synchronously clocked by the reference clock signal generated by the reference clock signal generation circuit 13, with the register content of the associated register bank, connected via the data line 20, in the first register array 8 being read in and buffer-stored in the register bank in the second register array 17. The synchronously clocked second register array 17 has data outputs 22-1 to 22-N which are connected via data lines 23-1 to 23-N to data inputs 24-1 to 24-N of a downstream synchronously clocked logic circuit 18. The synchronously clocked logic circuit 18 evaluates the register contents buffer-stored in the second register array 17 in order to reconstruct the serial input data stream at the data input 1 of the inventive data reception circuit and outputs reconstructed data streams with a reduced data transfer rate via the data outputs 25-1 to 25-N for further data processing.

Figure 2:
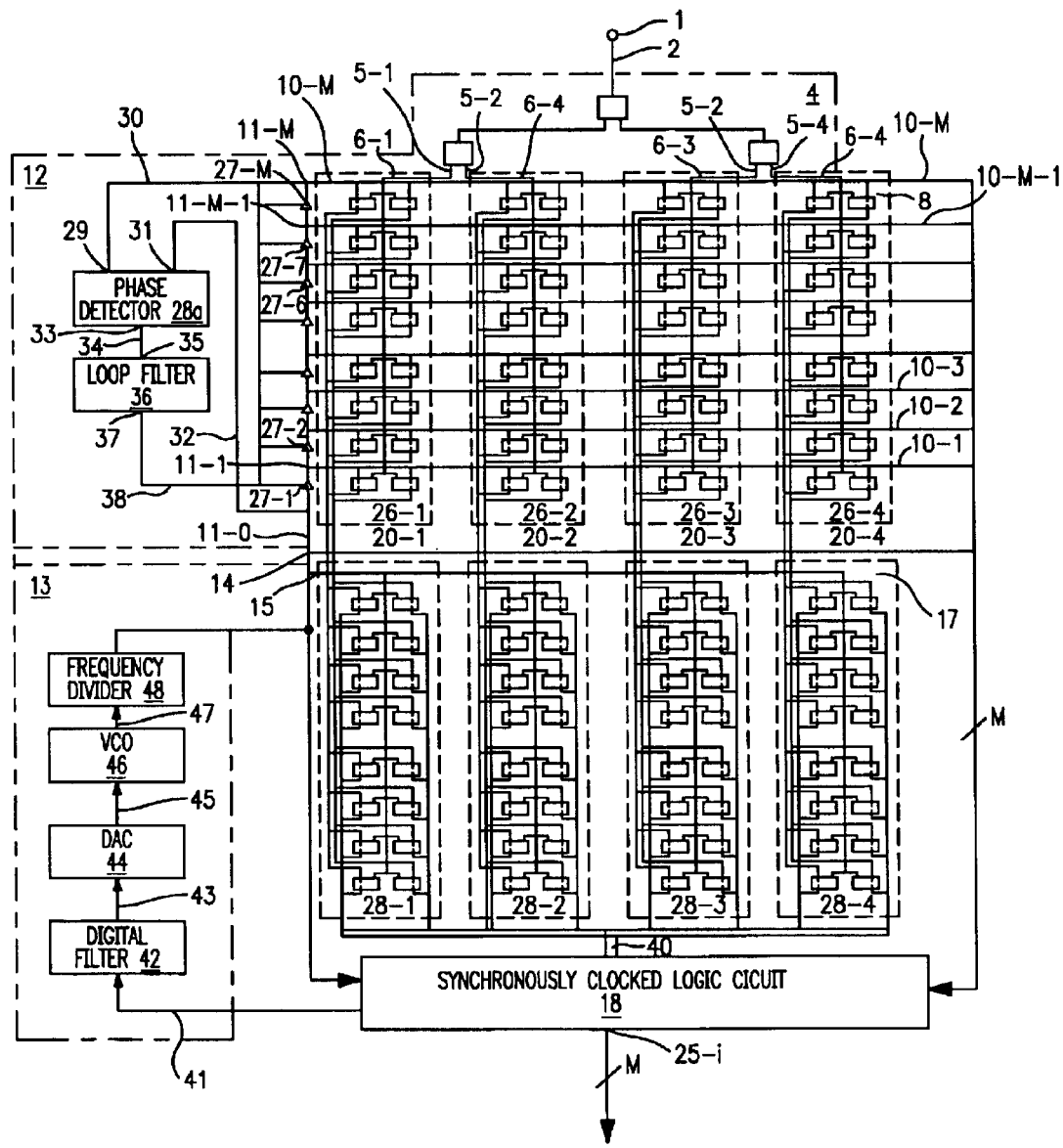
FIG. 2 shows a preferred embodiment of the inventive data reception circuit for receiving a serial input data stream with a high data transfer rate.

FIG. 2 shows the circuit design of a preferred embodiment of the inventive data reception circuit in detail. In the example shown in FIG. 2, to simplify the illustration, the data stream separation circuit 4 has only two separation stages and has four data outputs 5. The data stream separation circuit 4 outputs four separate data streams with a quarter of the data transfer rate of the original serial input data stream applied to the signal input 1. The first, asynchronously clocked register array 8 comprises a plurality of register banks 26-1 to 26-4, with each register bank 26 in the first register array 8 being asynchronously clocked by an associated separate data stream which is on the lines 6-1 to 6-4. To buffer-store a signal change in the separate data stream, each register bank 26 in the first register array 8 reads in a delayed reference clock signal from a signal output 10-1 to 10-M of the delay circuit 11. The delay circuit 12 contains a delay element chain 27 comprising a plurality of series-connected delay elements 27-1 to 27-M. The reference clock signal generated by the reference clock signal generation circuit 13 is applied to the first delay element 27-1 in the delay element chain 27. Each delay element 27-i outputs a delayed reference clock signal to the first, asynchronously clocked register array 8 via a line 10-i. In this case, the number of delay elements 27-i in the delay element chain 27 corresponds to the ratio between the clock period $T_{ref}$ of the reference clock signal and the signal propagation time of a delay element 27-i.

If the data transfer rate $r_E$ of the serial input data stream is 10 Gbit/sec, for example, and if a data stream separation circuit 4, as shown in FIG. 2, is implemented with two separation stages k=2, then $2^k$, i.e. four separate data streams, on the data stream separation circuit 4 are output to the asynchronously clocked first register array 8. The data stream separation circuit 4 quarters the data transfer rate in two separation stages. The reference clock signal generated by the reference clock generation circuit 13 has a clock frequency $T_{ref}$ which corresponds to the data transfer rate of the separate data streams, i.e. in the example shown in FIG. 2 the reference clock signal generation circuit 13 generates a reference clock of 2.5 GHz. The delay elements 27-i in the delay element chain 27 each have a particular signal propagation time which is not greater than the time period of a received data bit in the serial input data stream. The signal propagation time of a delay element 27-i is preferably chosen such that it is a quarter of the time period of the received data bit in the serial input data stream. With a data transfer rate for the separate data stream of 2.5 Gbit/sec, the duration of a reference clock period is 400 psec. The delay elements are preferably inverters manufactured using CMOS technology, for example, with the signal propagation time or delay of a delay element or buffer being approximately 25 psec. The number of delay elements M is calculated from the ratio between the clock period of the reference clock signal $T_{ref}$, i.e. 400 psec in the example illustrated, and the signal propagation time of a delay element used, i.e. 25 psec. In the example shown in FIG. 2, the number of series-connected delay elements is M=400 psec ./. 25 psec= 16. In the example shown in FIG. 2, only eight delay elements are shown in order to simplify the illustration.

The delay circuit 12 performs phase coupling between the delayed reference clock signal from the last delay element 27-M and the reference clock signal which is applied to the input of the first delay element 27-1. The delay circuit 12 is in the form of a DLL circuit (DLL: Delay Locked Loop) and has a phase detector 28a whose first input 29 is connected via a line 30 for [sic] the signal output 11-M of the last delay element 27-M, and whose second input 31 is connected via a line 32 to a signal input 11-0 of the first delay element 27-1. The phase detector 28a has an output 33 which is connected via a line 34 to a line 35 for a loop filter 36. The loop filter 36 uses a control signal output 37 to output a control signal via a line 38 to the delay element chain 27 in order to control the time period for the delay element chain 27. The delay elements 27-i in the delay element chain 27 are actuated via the control line 38. The delay element chain 27 comprises a series of buffers or inverter circuits which respectively transfer an input signal to their respective output with a certain time delay. In this case, the time delay of the individual inverters is proportioned to be as short as is permitted by the prescribed manufacturing technology. With 120 nm CMOS technology, the minimum delay time of an inverter element is approximately 25 psec. In this case, the time delay of a delay element is not greater than the duration of a bit in the serial input data stream. Since the time delay of a delay element 27-i is less than the duration of a data bit in the received serial input data stream, the received serial data stream is effectively oversampled, which significantly reduces the error rate of the inventive data reception circuit.

The delay element chain 27 is fed with the reference clock signal generated by the reference clock signal generation circuit 13, the frequency of said reference clock signal corresponding to the reduced data transfer rate of a separate data stream.

The delay element chain 27 represents the clock in the inventive data reception circuit to a certain extent. The reference clock signal passes by the M signal outputs of the delay element chain 27. Every 25 psec the reference clock signal has moved on to the next signal output 11-i+1 of the delay circuit 12. If, at any moment within the reference clock period, all the signal outputs 11-i of the delay element chain 27 are read into a register bank 26 in the asynchronously clocked first register array 8, then it is possible to reconstruct the exact time of the reading operation from the buffer-stored data at a later time.

In the example shown in FIG. 2, the asynchronously clocked register array 8 comprises four register banks 26-1 to 26-4, each register bank 26 being asynchronously clocked via the lines 6-1 to 6-4 by a separate data stream and reading in the delayed reference clock signals which are on the signal lines 10-1 to 10-M from the delay element chain 27 in order to buffer-store a signal change in the separate data stream.

Each of the register banks 26-1 to 26-4 (shown in FIG. 2) in the first, asynchronously clocked register array contains a first register for buffer-storing a rising signal edge in the associated separate data stream, and a second register for buffer-storing a falling signal edge in the associated separate data stream. In this case, each register comprises M D-type flip-flops. The clock inputs of the D-type flip-flops in the first register in a register bank 26, i.e. the D-type flip-flops in the left-hand column, receive the separate data stream without inversion, while the clock inputs of the D-type flip-flops in the second register, i.e. in the right-hand column, receive the separate data stream in inverted form. The D-type flip-flops in the first register thus switch upon a rising signal edge in the separate data stream, while the D-type flip-flops in the second register switch upon a falling signal edge. While the first register reacts to a rising signal edge in the separate data stream, the second register in the corresponding register bank 26 reacts to a falling signal edge. If there is a signal change in one of the signal outputs 5 of the data stream separation circuit 4, with the signal change having been caused by a signal change in the serial input data stream at the signal input 1 of the data reception circuit, the time of the event, i.e. of the signal change, is clearly determined and recorded by reading in the signal outputs 11-i of the delay element chain 27. Since the data stream separation circuit 4 ensures that one of its signal outputs 5 cannot produce more than one signal change or event at a reduced data transfer clock rate, the asynchronously clocked register banks 26 in the first register array 8 can readily be synchronized.

The data outputs of the D-type flip-flops in the register banks 26 within the asynchronously clocked first register array 8 are transferred via data buses 20 to the data inputs of the D-type flip-flops and associated register banks 28 within the synchronously clocked second register array 17. The number of register banks 28 within the second register array 17 corresponds to the number of register banks 26 within the first register array 8. The number of D-type flip-flops within the register banks 28 corresponds to the number of D-type flip-flops within the register banks 26, and hence to the number of delay elements M in the delay element chain 27. Each register bank 28 within the second register array 17 comprises, for its part, two registers. The clock inputs of all the D-type flip-flops within the second register array 17 are clocked with the reference clock signal via the reference clock line 15 from the reference clock signal generation circuit 13. Upon a rising signal edge in the reference clock signal, the registers in the synchronously clocked register array 17 read in the register content of the two registers in the associated register bank 26 in the first register array 8 via the data buses 20. The data inputs of the D-type flip-flops in the first register in a register bank 28-i in the second, synchronously clocked register array 17 are connected to the data outputs of the D-type flip-flops in the first register and to an associated register bank 26 in the first, asynchronously clocked register array 8. The data inputs of the D-type flip-flops in the second register in a register bank 28-i in the second, synchronously clocked register array 17 are connected to the data outputs of the D-type flip-flops in the second register of the associated register bank 26 in the first, asynchronously clocked register array 8.

The data outputs of the D-type flip-flops in the register banks 28-i in the second, synchronously clocked register array 17 are connected to the synchronously clocked logic circuit 18 via data buses 40. The synchronously clocked logic circuit 18 evaluates the register contents buffer-stored in the second register array 17 in order to reconstruct the serial input data stream applied to the signal input 1.

The reference clock signal generation circuit 13 can be implemented in various ways. In a first embodiment, the reference clock signal generation circuit 13 has a low-frequency oscillator which oscillates at a low frequency corresponding to the data transfer rate of the separate data streams, that is to say, by way of example, 2.5 GHz in the example shown in FIG. 2.

In an alternative embodiment, the reference clock signal generation circuit 13 contains a high-frequency oscillator which oscillates at a high frequency, and a frequency divider which divides the high frequency into a low frequency corresponding to the data transfer rate of the separate data streams.

In the preferred embodiment shown in FIG. 2, the reference clock signal is recovered from the received data. This achieves a fixed phase relationship between the data transfer clock for the received data and the reference clock for the reference clock signal.

The number of signal edges or events occurring in M bits in the serial input data stream is between 0 and M, depending on the data record. The logic circuit 18 determines the number of signal edges and determines the relative discrepancy therein with respect to the next nominal position. In this case, the nominal position is that output 11-i of the delay element chain 27 at which the reference clock signal arrives with a delay at the time of a signal change at the input 1 of the data reception circuit, if the phases of the received data signal and the reference clock signal coincide. If the signal propagation time of a delay element 27-i is a quarter of a data bit period, there are four possibilities for the position in time of a signal edge in the data stream, one of these possibilities corresponding to the nominal position. The M available nominal positions in the delay element chain each have three positions among them at which a signal edge occurs only if it arrives at the signal input of the inventive data reception circuit too early or too late as a result of signal interference, or if there is a phase difference between the reception clock and the reference signal clock.

A phase difference calculation unit weights the position in front of the nominal position preferably with a value +1, and weights the position behind the nominal position with a value −1. The positions situated precisely between two nominal positions are uniformly associated either with the nominal positions in front of them or with the nominal positions behind them, and are given either the weighting +2 or the weighting −2. The values determined in this way are summed for the individual signal edges to form a $2+\lambda$ dM bit number (M possible signal edges with a temporal resolution of 2 bits) and are averaged over the number of signal edges occurring. The phase difference calculation unit thus calculates an estimate of the phase difference which is actually present. The calculated phase difference value is output by the logic circuit 18 via a line 41 to a digital filter 42, where it is subjected to digital filtering in order to stabilize it. The digital output value from the filter 42 is output via a line 43 to a digital/analog converter 44, where it is converted into an analog control voltage. The analog control voltage is output via a control line 45 to a voltage-controlled oscillator 46, which oscillates at a faster or slower rate in line with the alteration in the control voltage. The oscillator signal which is output by the oscillator 46 is output via a line 47 to a frequency divider 48 which generates the desired reference clock signal by frequency division.

The data which are read from the second register array 17 are evaluated by the synchronously clocked logic circuit 18 in order to reconstruct the serial input data stream. In this case, the data are digitally reconstructed in a plurality of steps. First, the logic circuit 18 determines at which of the outputs 5-i of the data stream separation circuit 4 a signal change has occurred. This is done, by way of example, by means of a comparison with the register contents of the register banks in the previous clock period. Next, the time stored in the register banks in question is evaluated. This time is explicitly characterized by the signal image, stored in the register bank in question, for all the signal outputs 11 in the delay circuit 12. The register in the register bank stipulates whether the signal edge detected at the data input is a rising signal edge or a falling signal edge. The logic circuit 18 thus ascertains the time at which a rising signal edge or a falling signal edge has occurred in the serial input data stream. This edge-coded information is transformed back preferably into a level-coded signal form by the synchronously clocked logic circuit 18. In one preferred embodiment, the logic circuit 18 has a thermometer-coding circuit for thermometer-coding the delayed reference clock signals which are output from the signal outputs 11 of the delay element chain 27 via the lines 10. Thermometer-coding is performed in order to compress the M outputs of the delay element chain. This back-transformation is performed by the logic circuit 18 by inserting logic-high data bits between each buffer-stored, rising signal edge and the next falling signal edge and by inserting logic-low data bits between the falling edge and the next rising signal edge.

In one alternative embodiment, the logic circuit 18 XORs the register contents, received via the signal lines 40, of the registers in the second register array 17 in order to reconstruct the serial input data stream, and uses M signal outputs to output reconstructed data signal streams with a reduced data transfer rate for further data processing.

FIG. 2 shows a preferred embodiment of the inventive data reception circuit. In alternative embodiments, instead of the DLL circuit 12, a multi-phase oscillator, particularly a ring oscillator, is used whose design causes it to deliver a plurality of clock signals shifted with respect to one another. To increase the reference clock signals shifted in time, additional clock signals shifted in time are generated preferably by a phase interpolator circuit.

List of Reference Symbols
1 Data input
2 Line
3 Signal input
4 Data stream separation circuit
5 Data outputs
6 Data lines 7 Data inputs
8 Asynchronously clocked register array
9 Inputs
10 Lines
11 Signal outputs
12 Delay circuit
13 Reference signal generation circuit
14 Clock line
15 Clock line
16 Clock line
17 Synchronously clocked register array
18 Logic circuit
19 Data outputs
20 Data lines
21 Data inputs
22 Data outputs
23 Data lines
24 Data inputs
25 Data outputs
26 Register banks
27 Delay elements
28 Register banks
28a Phase detector
29 Signal input
30 Line
31 Signal input
32 Line
33 Output
34 Line
35 Input
36 Digital loop filter
37 Output
38 Control line
39 Data line
40 Line
41 Line
42 Digital filter
43 Line
44 Digital/analog converter
45 Line
46 Voltage-controlled oscillator
47 Line
48 Frequency divider

What is claimed is:

1. Data reception circuit for receiving a serial input data stream with a high data transfer rate, where the data reception circuit has:
   (a) a data stream separation circuit for separating the serial input data stream into a plurality of separate data streams with a reduced data transfer rate;
   (b) a reference clock signal generation circuit for generating a reference clock signal whose clock frequency corresponds to the data transfer rate of the separate data streams;
   (c) a delay circuit having a delay element chain which comprises a plurality of series-connected delay elements, each delay element having a signal propagation time, the first delay element in the delay element chain receiving the generated reference clock signal, and each delay element outputting a delayed reference clock signal via a signal output in the delay circuit;
   (d) a first, asynchronously clocked register array which comprises a plurality of register banks, each register bank in the first register array being asynchronously clocked by an associated separate data stream and reading in the delayed reference clock signals from the delay circuit in order to buffer-store a signal change in the separate data stream;
   (e) a second, synchronously clocked register array which comprises a plurality of register banks, each register bank in the second register array being synchronously clocked by the reference clock signal and reading in and buffer-storing the register content of an associated register bank in the first register array;
   (f) and a synchronously clocked logic circuit which evaluates the register content buffer-stored in the second register array in order to reconstruct the serial input data stream.

2. Data reception circuit according to claim 1, wherein each register bank in the first, asynchronously clocked register array has a first register for buffer-storing a rising signal edge in the associated separate data stream, and a second register for buffer-storing a falling signal edge in the associated separate data stream.

3. Data reception circuit according to claim 2, wherein each register bank in the second, synchronously clocked register array has two registers which read in the register content of the two registers in the associated register bank in the first register array upon a rising signal edge in the reference clock signal.

4. Data reception circuit according to claim 3, wherein the registers in the first register array and in the second register array comprise a plurality of edge-triggered D-type flip-flops.

5. Data reception circuit according to claim 4, wherein the number of edge-triggered D-type flip-flops in the registers in the first register array and in the second register array is equal to the number of series-connected delay elements in the delay element chain.

6. Data reception circuit according to claim 4, wherein the clock inputs of the D-type flip-flops in the first registers in all the register banks within the first, asynchronously clocked register array receive a separate data stream which is output by the data stream separation circuit.

7. Data reception circuit according to claim 4, wherein clock inputs of the D-type flip-flops in the second registers in all the register banks within the first, asynchronously clocked register array receive a separate data stream, which is output by the data stream separation circuit, in inverted form.

8. Data reception circuit according to claim 4, wherein the data inputs of the D-type flip-flops in the first register and in the second register in a register bank in the asynchronously clocked first register array are connected to an associated signal output in the delay element chain.

9. Data reception circuit according to claim 4, wherein the clock inputs of the D-type flip-flops in the registers in all the register banks within the second, synchronously clocked register array receive the generated reference clock signal.

10. Data reception circuit according to claim 4, wherein the data inputs of the D-type flip-flops in the first register in a register bank in the second, synchronously clocked register array are connected to data outputs of the D-type flip-flops in the first register in an associated register bank in the first, asynchronously clocked register array.

11. Data reception circuit according to claim 4, wherein the data inputs of the D-type flip-flops in the second register in a register bank in the second, synchronously clocked register array are connected to data outputs of the D-type flip-flops in the second register in an associated register bank in the first, asynchronously clocked register array.

12. Data reception circuit according to claim 4, wherein the data outputs of the D-type flip-flops in the register banks in the second, synchronously clocked register array are connected to the logic circuit.

13. Data reception circuit according to claim 1, wherein the data stream separation circuit comprises data stream separation circuit elements connected in cascade form in a plurality of separation stages, the data transfer rate of the serial input data stream being halved with every separation stage.

14. Data reception circuit according to claim 13, wherein the number of separate data streams is $2^k$, where k is the number of separation stages.

15. Data reception circuit according to claim 1, wherein the delay element chain comprises a plurality of series-connected inverters with an adjustable signal propagation time.

16. Data reception circuit according to claim 1, wherein the number of series-connected delay elements is equal to the ratio between the clock period of the reference clock signal and the signal propagation time of a delay element.

17. Data reception circuit according to claim 1, wherein the signal propagation time of a delay element is not greater than the time period of a received data bit in the serial input data stream.

18. Data reception circuit according to claim 1, wherein the signal propagation time of a delay element is a quarter of the time period of a received data bit in the serial input data stream.

19. Data reception circuit according to claim 1, wherein the reference clock signal generation circuit has a low-frequency oscillator which oscillates at a low frequency corresponding to the data transfer rate of the separate data streams.

20. Data reception circuit according to claim 1, wherein the reference clock signal generation circuit has a high-frequency oscillator which oscillates at a high frequency, and a frequency divider which divides the high frequency into a low frequency corresponding to the data transfer rate of the separate data streams.

21. Data reception circuit according to claim 1, wherein the reference clock signal generation circuit has a voltage-controlled oscillator.

22. Data reception circuit according to claim 1, wherein the reference clock signal generated by the reference clock signal generation circuit has a constant phase difference with respect to the received serial input data stream.

23. Data reception circuit according to claim 1, wherein a phase difference calculation unit is provided which calculates the phase difference between the reference clock signal and the serial input data stream and outputs a digital phase difference signal.

24. Data reception circuit according to claim 23, wherein the digital phase difference signal is filtered by a digital filter for the purpose of signal stabilization.

25. Data reception circuit according to claim 24, wherein the filtered digital phase difference signal is converted by a digital/analog converter into an analog oscillator control voltage for a voltage-controlled oscillator in the reference clock signal generation circuit, where the voltage-controlled oscillator oscillates at an altered frequency on the basis of the applied oscillator control voltage in order to minimize the phase difference between the reference clock signal and the serial input data stream.

26. Data reception circuit according to claim 1, wherein the data stream separation circuit has data stream separation circuit elements connected in cascade form, in four separation stages in that the delay circuit contains sixty-four delay elements, wherein the first register array and the second register array have sixteen register banks, with each register bank containing two registers which each comprise sixty-four D-type flip-flops.

27. Data reception circuit according to claim 1, wherein the signal propagation time of a delay element is approximately 25 psec.

* * * * *